Oct. 10, 1939.  R. SCHNARZ  2,175,920

ELECTRIC SEAM WELDING

Filed March 6, 1937

WITNESSES:
Wm. B. Sellers.
Hymen Diamond.

INVENTOR
Richard Schnarz
BY F. W. Lyle.
ATTORNEY

Patented Oct. 10, 1939

2,175,920

UNITED STATES PATENT OFFICE 2,175,920

ELECTRIC SEAM WELDING

Richard Schnarz, Berlin-Siemensstadt, Germany, assignor to Westinghouse Electric & Manufacturing Company, East Pittsburgh, Pa., a corporation of Pennsylvania Application March 6, 1937, Serial No. 129,441
In Germany July 13, 1936

10 Claims. (Cl. 219—4)

Arrangements for seam point welding have become known in which the welding current circuits are periodically connected and disconnected with the aid of controllable gas or vapor discharge paths, particularly grid-controlled mercury vapor discharge paths. The discharge paths are in this case, in general, connected in anti-parallel in the primary circuit of an alternating-current welding transformer. In these regulating arrangements, not only the magnitude of the current flowing during the operating period is controlled, but preferably also the magnitude of the current flowing during the pause periods.

In the tubes constructed to be used in the building of reservoirs and in airplane industry, seam welds that shall manifest the smallest possible imprint in the working material, is to a large extent required. This may be attained by welding arrangements in which the pause current is adjustable to a definite value, and in addition the operating relationships are regulable in corresponding fine steps, and in fact, as far as possible, stepless.

The object of the invention is a device for controlling the discharge paths connected in the welding circuits by which the regulation of the pause current is made possible in a particularly simple and advantageous manner.

According to the invention, the control potential of the discharge paths is composed of two potential components, each of which is individually regulable; the components are so dimensioned that one of them can influence the ignition time point of the discharge paths only if the other component is disconnected. Accordingly, the control potential is formed of a base potential and a second potential superimposed on it. The base potential serves for adjusting the working current while the control potential superimposed on it regulates the pause current. As base potential, a control potential is utilized which is preferably rectangular-shaped and is, for example, supplied from a direct-current source; this potential is positive as long as working currents should flow through the discharge paths. On this rectangular-shaped base potential an alternating-current potential, and indeed preferably a potential of peaked wave form, is superimposed; the latter affects the ignition time point of the discharge paths only if the rectangular-shaped base potential is disconnected. The ignition time point of the discharge paths depends on the phase potential of the potential peaks with reference to the alternating-current potential supplied to the anodes, and this phase position is so adjusted that the current flowing in the pause intervals has the proper value.

Figure 1:
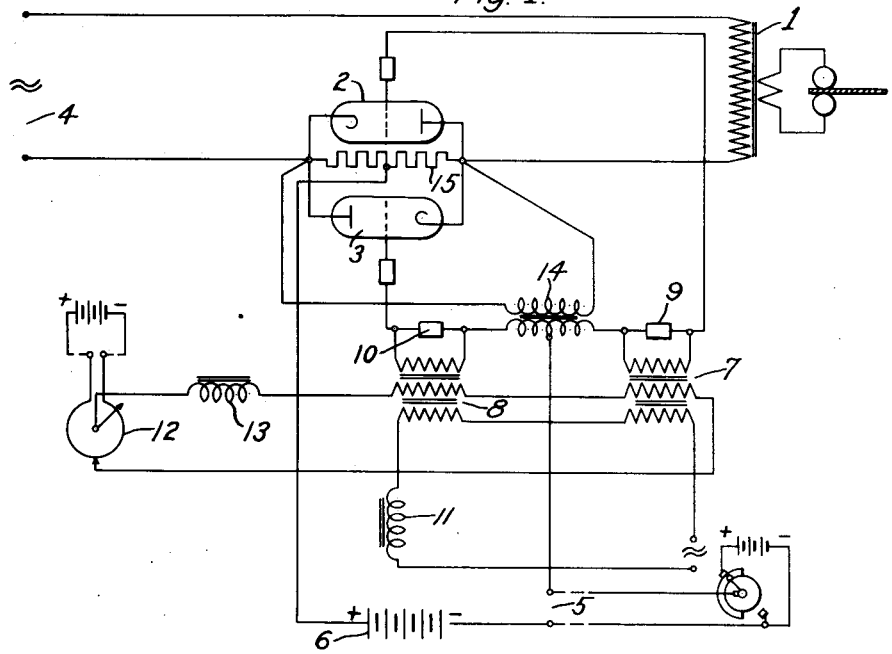
Fig. 1 is a diagrammatic view showing an embodiment of my invention.

In the drawing, the circuit of a seam point welding arrangement is illustrated as an embodiment of the invention; in this circuit the welding transformer 1 is connected to the alternating-current network 4 through two grid-controlled mercury vapor discharge vessels 2 and 3. In the grid circuit of both discharge vessels, a control potential source 5, not illustrated in detail, is connected; this source supplies rectangular-shaped positive potential impulses in periodic sequence. As control potential source, one of the known timing circuit arrangements may be utilized here; the latter may, for example, also operate with controllable gas or vapor discharge paths. On the rectangular-shaped potential impulses supplied by this control potential source a negative blocking potential 6 is superimposed.

In addition to both of these control potentials, grid transformers 7 and 8 are connected in the grid circuits of both of the discharge paths 2 and 3 in accordance with the invention, the latter produce across the resistors 9 and 10 potential peaks of definite phase position. For this purpose, the transformers 7 and 8 are equipped with a saturated iron core and two exciting windings, of which one is fed with direct current and the other with alternating current. In the alternating-current exciting circuit, a choke coil 11 is connected which imparts to the exciting current a triangular shape. In the direct-current exciting circuit a regulating resistor 12 is connected by the operation of which the phase position of the potential peaks in the grid circuit of the discharge vessels 2 and 3 is adjusted. Between the resistance 12 and the transformers 7 and 8, an additional filtering choke 13 is connected. In addition, a compensating transformer 14 is connected in the grid circuits of both discharge vessels 2 and 3, which is connected to a resistor 15 in known manner.

Figure 2:
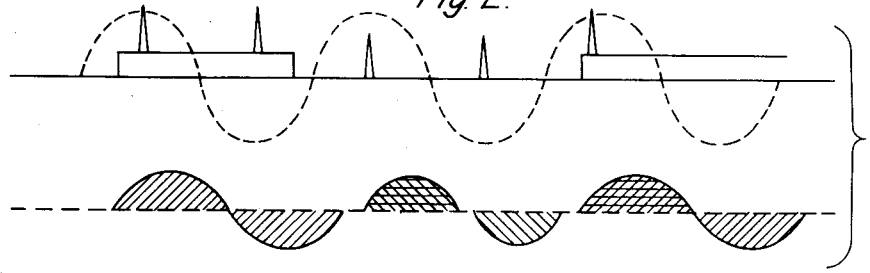
Fig. 2 is a graph illustrating the operation of my invention for one setting of the control system.
Figure 3:
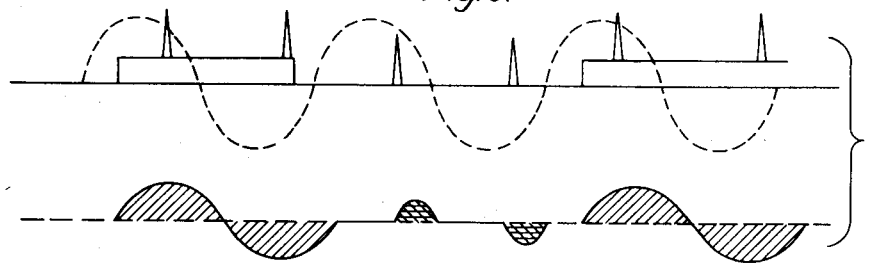
Fig. 3 is a graph illustrating the operation of my invention for another setting of the control system.

The operation of the regulating device will be understood from the diagrams illustrated in Figs. 2 and 3. In the upper part of the diagrams, the anode potentials and the control potentials are illustrated, and in the lower part the alternating currents flowing in the welding circuit are shown. The diagram of Fig. 2 applies to large pause currents, the diagram of Fig. 3 for small pause currents. From the diagram it is clearly apparent that the potential peaks superimposed on the rectangular-shaped control potentials are only effective when the rectangular-shaped potential is disconnected.

I claim as my invention:

1. A device for seam point welding with the aid of controllable gas or vapor discharge paths, particularly grid-controlled mercury vapor discharge paths, in which the working current, as well as the current in the pause intervals, is regulable, characterized by means for supplying control potential to the discharge paths which is composed of two components, and means for regulating each of said components individually, said regulating means being so set as to provide components of magnitudes such that one of them can influence the ignition time point of the discharge paths only when the other is disconnected.

2. A device according to claim 1, characterized by the fact that the discharge paths are supplied with a positive control potential during substantially the whole period during which the working current flows and a potential of peaked wave form superimposed thereon.

3. In combination, a discharge device having a control electrode and a plurality of principal electrodes, a source for impressing a difference of potential between said principal electrodes, means for impressing between said control electrode and one of said principal electrodes a first potential such that said discharge device is energized, means for superimposing a second potential on said first potential that is sufficient to energize said discharge device in the absence of said first-potential and means for varying said second potential to vary the energization of said discharge device in the absence of said first potential.

4. Apparatus according to claim 3 characterized by the fact that the first potential is applied periodically.

5. In combination, a discharge device having a control electrode and a plurality of principal electrodes, a source for impressing a periodically pulsating difference of potential between said principal electrodes, means for impressing between said control electrode and one of said principal electrodes a first potential such that said discharge device is energized, said first potential being applied so as to energize said discharge device during an interval during which a predetermined number of periodic pulsations of said source take place and thereafter being discontinued during another interval during which a predetermined number of periodic pulsations of said source take place, means for superimposing a second potential on said first potential that is sufficient to energize said discharge device in the absence of said first-potential, said second potential being applied during both of the above said intervals and means for varying said second potential to vary the energization of said discharge device in the absence of said first potential.

6. Apparatus according to claim 5 characterized by the fact that the second potential is of the pulsating type, the length of each pulse of said potential being no greater than the length of a periodic pulsation of the source and one pulse of the second potential being applied during each pulsation of the source during both of the intervals.

7. Apparatus according to claim 5 characterized by the fact that the second potential is of the pulsating type, the length of each pulse of said potential being no greater than the length of a periodic pulsation of the source and one pulse of the second potential being applied during each pulsation of the source during both of the intervals and further characterized by a means for varying the second potential which operates to shift the phase of the pulses relative to the pulsations of said source.

8. Apparatus according to claim 5 characterized by the fact that the second potential is of the pulsating type, each pulse of said second potential being of peaked wave form and one pulse of the second potential being applied during each pulsation of the source during both of the intervals.

9. Apparatus according to claim 5 characterized by the fact that the second potential is of the pulsating type, each pulse of said second potential being of peaked wave form and one pulse of the second potential being applied during each pulsation of the source during both of the intervals and further characterized by means for varying the second potential which operates to shift the phase of the pulses relative to the pulsations of said source.

10. The method of welding to produce a seam weld that does not conspicuously manifest the imprint of the weld which comprises applying sufficient current to fuse the material to be welded periodically and in the intervals between applications of sufficient current to fuse applying current insufficient to fuse and adjusting the latter current to such a value that the imprint is inconspicuous.

RICHARD SCHNARZ.